June 15, 1948.  L. J. ANDRES  2,443,491
MULTIPLE CLUTCH

Filed June 29, 1944  2 Sheets-Sheet 1

INVENTOR.
Lloyd J. Andres

Inventor
Lloyd J. Andres

Patented June 15, 1948

2,443,491

UNITED STATES PATENT OFFICE 2,443,491

MULTIPLE CLUTCH

Lloyd J. Andres, Chicago, Ill., assignor to Automatic Instrument Company, Chicago, Ill., a corporation of Michigan Application June 29, 1944, Serial No. 542,695

4 Claims. (Cl. 192—48)

This invention relates in general to mechanical clutches and more particularly to a self-energizing multiple clutch for starting and stopping two driven shafts, independently of each other from a single drive shaft. Ordinary clutches for accomplishing a similar purpose usually require considerable expenditure of energy for engagement and disengagement, and the means employed for synchronizing the stopping and starting of independent drive shafts are dependent upon complicated structures and the use of safety devices for preventing two driven members from being inadvertently engaged at the same time. This invention overcomes the above objections through the use of a novel arrangement of elements and a new control means whereby relatively small forces for its operation are required for engaging and disengaging a clutch and inherently provides precision timing means for controlling two independent driven shafts from a single drive shaft.

A principal object of the invention is the provision of a self-energizing multiple clutch for independently starting and stopping two driven shafts from a single drive shaft.

A further object of the invention is the provision of a self-energized clutch for starting and stopping a driven shaft from a drive shaft by means of a rotary control member.

A further object of the invention is the provision of a clutch for stopping and starting a pair of concentrically driven shafts from a concentrically positioned drive shaft by means of a single control member positioned adjacent to the clutch.

Other objects and advantages in one embodiment of the invention are described in the appended specification and drawings in which.

Figure 1:
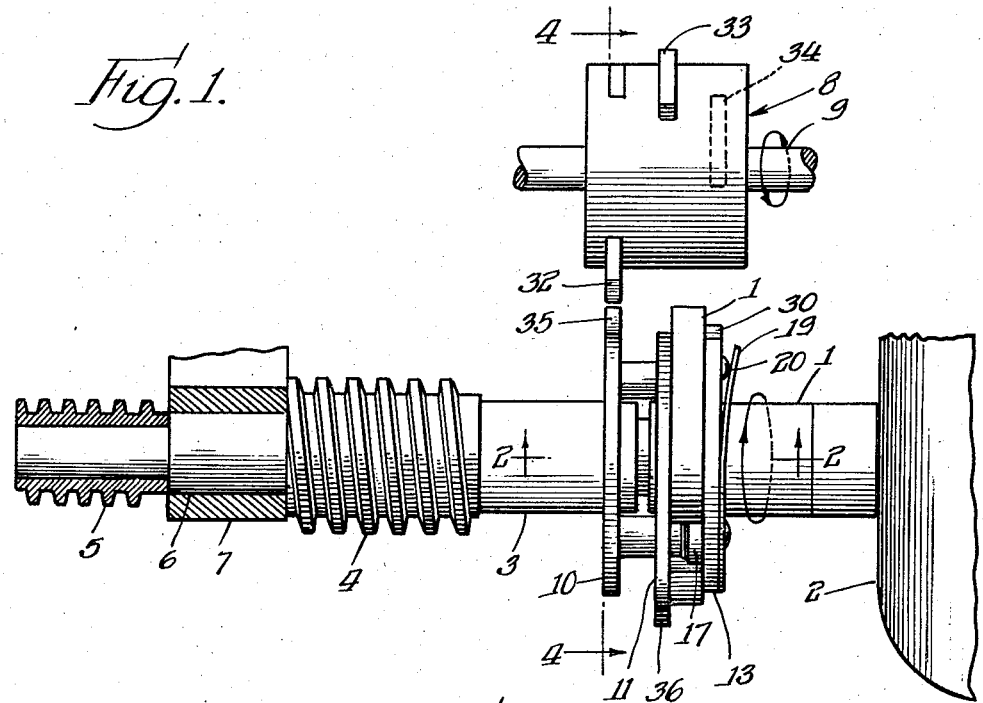
Fig. 1 is a fragmentary illustration of the clutch and its control member operatively connected between a pair of concentrically driven shafts and a drive shaft.

Referring to Fig. 1, a flange drive member 1 is concentrically secured to the drive shaft of a motor 2, and adapted to rotate in the direction shown by arrow. A driven shaft 3, integral with a concentric worm gear 4, represents a driven member. Worm gear 5, representing a second driven member integral with shaft 6, is supported in a stationary bearing 7 and in a concentric bore in the shaft 3. A rotary clutch control member 8 is carried on shaft 9, and will be hereinafter described in detail.

Figure 5:
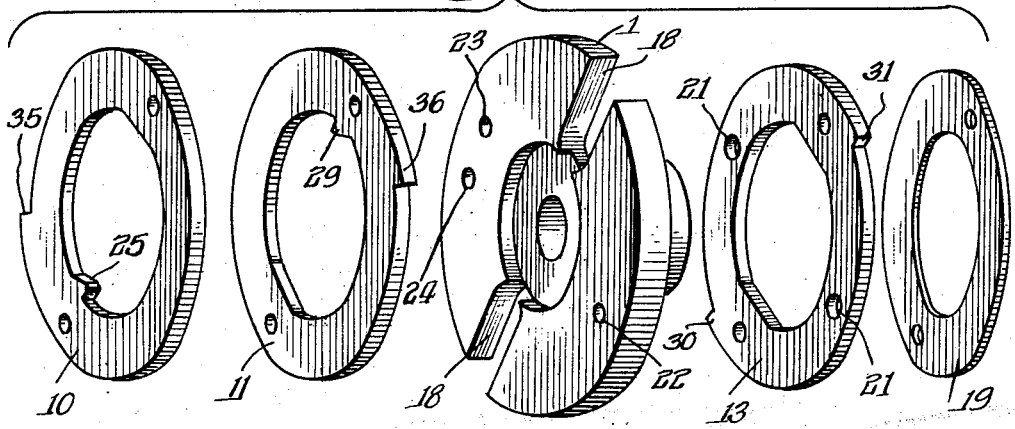
Fig. 5 is a perspective exploded view of the principal elements of the clutch.
Figure 2:
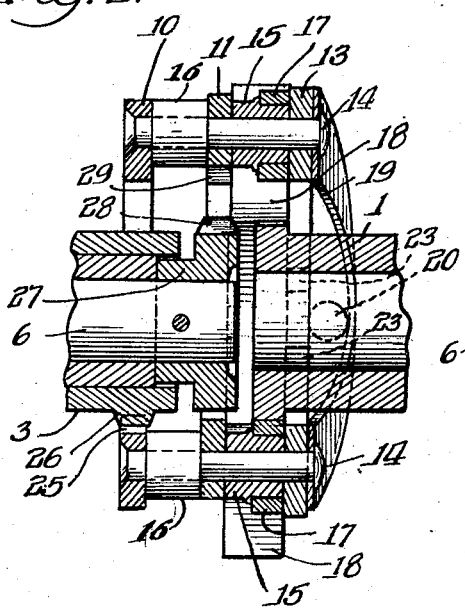
Fig. 2 is a fragmentary cross-section of the clutch shown in Fig. 1 taken through axis 2—2, Fig. 1.
Figure 3:
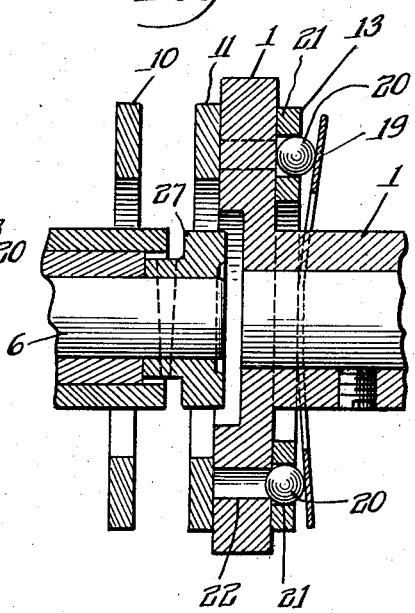
Fig. 3 is a cross-sectional view of the clutch shown in Fig. 1 taken through axis 2—2, Fig. 1 at right angles to the view shown in Fig. 2.
Figure 4:
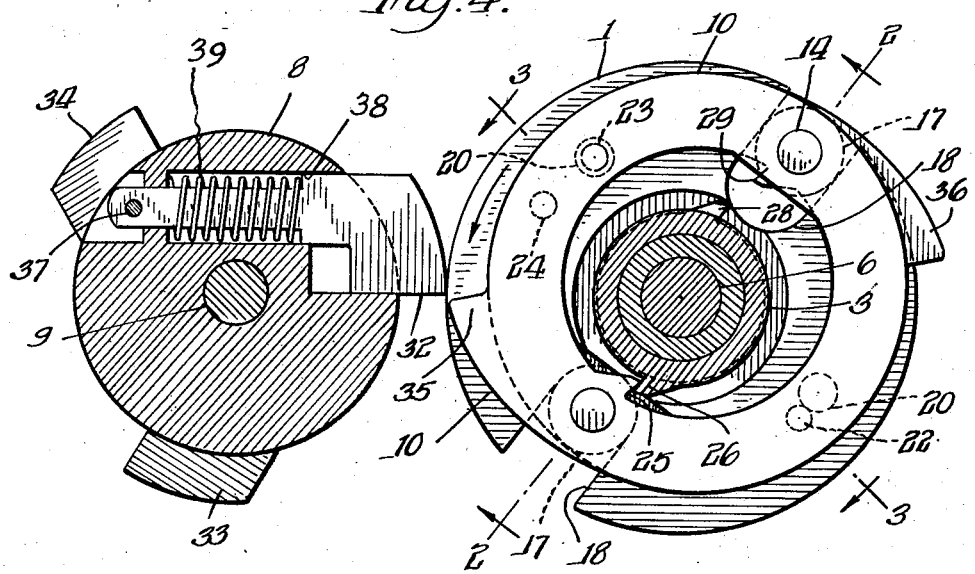
Fig. 4 is a cross-sectional view of the clutch shown in Fig. 1 taken along section lines 4—4, Fig. 1.

The principal clutch members 10, 11, 12, and 13 and drive member 1, Fig. 5, are shown in assembled relationship in Figs. 2, 3, and 4.

Referring to Fig. 2, the flange drive member 1 is shown secured to the motor shaft. The clutch control members 10, 11, and 13 are held in a fixed spaced relation with each other by two oppositely positioned studs 14—14 and spacers 15—15 and 16—16. Collars 17—17, integral and concentric with spacers 15—15, are slidably fitted into slots 18—18 of the flange member 1 shown in Fig. 4. Thus, the assembly of members 10, 11, and 13 is retained for rotation in the slots 18—18 in the flange and the members are adapted to be moved predetermined distances at right angles to the axis of rotation of the flange member 1.

Referring to Fig. 3, a flat circular spring 19 is retained by the studs 14—14 in a position for urging detent balls 20—20 retained in holes 21—21 of member 13 toward the outer face of the flange 1. Detent holes 22, 23, and 24 in flange 1 (Fig. 5) are provided for retaining the clutch members 10, 11, and 13 in three different lateral positions with respect to the axis of the flange 1. When the members 10, 11, and 13 are in their neutral disengaged position, the ball 20 is seated in hole 22 as shown in Fig. 3. When the clutch is shifted by means to be hereinafter described, the members 10, 11, and 13 will be held by reason of the seating of the other ball 20 in hole 23 for driving one of the driven shafts and will be held by reason of the seating of said other ball 20 in hole 24 for driving the second driven shaft.

Shaft 3, shown in Fig. 2, contains an integral tooth 26 projecting from its outer periphery, and clutch member 10 has a mating tooth 25 projecting from its inner periphery so that when the clutch members 10, 11 and 13 are shifted to the position shown in Figs. 2 and 4, and the flange 1 is rotated, the teeth 25 and 26 will engage each other to drive the shaft 3.

Driven member 27, Fig. 2, is integral with the end of driven shaft 6, and has an integral tooth 28 on its outer periphery. Clutch member 11 has a mating tooth 29 on its inner periphery, which tooth will engage with tooth 28 of the member 27 when the members 10, 11, and 13 are shifted to a position for engagement. This movement will automatically disengage the teeth 25 and 26 required for driving the first driven shaft 3.

Clutch members 10 and 11 have eccentric camming projections 35 and 36 respectively, on their outer peripheries, and clutch member 13 has two oppositely disposed concentric camming projections 30 and 31 on its outer periphery.

The clutch control member 8, shown in Figs. 1 and 4, is mounted on shaft 9 parallel to and at a fixed distance from the axis of rotation of the clutch and has resiliently mounted therein three striker plates 32, 33, and 34. These plates are positioned to cooperate with clutch members 10, 11, and 13 respectively. The end of each striker plate is adapted to be manually, or otherwise moved, into the path of the eccentric projection of a corresponding clutch member when the latter is rotated. In the position shown in Fig. 4, and assuming that flange 1 is rotated in the direction shown by arrow, striker plate 32 has just completed contact with projection 35 which laterally moved the members 10, 11, and 13, to a position where the ball detent 20 has engaged hole 23 in the flange member 1, and engaged the teeth 25 and 26, thus imparting rotation to shaft 3 and worm 4 shown in Fig. 1.

When clutch member 8 is rotated 120 degrees in the direction shown by arrow, striker plate 33 will engage projection 36 on clutch member 11, and move members 10, 11, and 13 laterally in opposite direction from the previous operation whereby teeth 25 and 26 will be disengaged and teeth 28 and 29 will be engaged, which will stop rotation of shaft 3 and impart rotation to shaft 6 and worm 5.

When clutch control member 8 is rotated a further 120 degrees, striker plate 34 will engage one of the projections 30 or 31 of clutch member 13, and move members 10, 11, and 13 laterally to their neutral position with the detent ball in engagement with hole 22 in flange 1, which movement will disengage teeth 28 and 29 of clutch member 11 and driven member 27, thus stopping the rotation of shaft 6 and worm 5.

It is apparent that various combinations of successive movements of the clutch control 8 will operate the clutch accordingly. For example, when plate 32 is moved into its operating position, it will always cause the engagement of shaft 3, whereas when striker 33 is moved into its operating position, it will always cause the engagement of shaft 6, and likewise when striker 34 is moved into operating position, it will always cause the disengagement of shaft 3 or shaft 6 from the driving flange by virtue of the contact of the projection 30 or 31 of the plate 13 with the striker 34.

Each striker, 32, 33, and 34 is retained in a separate pocket 38 against the restraining action of a spring 39 by pin 37, thus each striker is capable of inward movement in order to prevent jamming between the striker and its corresponding clutch member projection in the event the two tips of mating teeth are positioned against each other when the camming projections of the clutch member engage the striker. Under these conditions the striker will move inwardly against the restraining action of its spring 39 and permit the projection to pass for another revolution before again striking and moving the members 10, 11, and 13 into their shifted positions.

It is apparent from the foregoing that the energy for shifting the clutch members 10, 11, and 13 for engaging and disengaging the two driven shafts, is obtained from the rotative energy supplied to the flange 1, hence a very slight amount of independent energy is all that is required to position the control member 8 for controlling the various functions of the clutch.

Having described my invention I claim:

1. A self-energizing clutch comprising a rotatable drive member, two driven members concentric with each other positioned on the same axis as said drive member and having their ends positioned adjacent to said drive member, each said driven member having engagement means on its outer periphery, an engaging member slidably secured to said drive member and adapted to three transverse positions with respect to the axis of said drive member, said engaging member having two independent abutting means thereon corresponding to each said engagement means whereby one transverse position of the engaging member will engage one abutting means with a corresponding said engagement means to drive one said driven member when said drive member is rotated, and whereby the opposite transverse position of said engaging member will engage its second abutting means with a corresponding said engagement means to engage the second driven member when said drive member is rotated and whereby the central transverse position of said engaging member will prevent the engagement of either abutting means with either said engagement means when said drive member is rotated.

2. A self-energizing clutch comprising a rotatable drive member, a pair of concentrically positioned driven members positioned on the same axis as said drive member, said driven members having independent engagement means on their ends adjacent to said drive member, a shifting member slidably secured to said drive member, said drive member including a detent means for holding said shifting member in three different transverse positions with respect to the axis of said drive member, said shifting member having two abutments for independently engaging each said engagement means, and having three spaced cam projections on its outer periphery, three movable striker plates positioned adjacent to said shifting member, each said plate adapted to be positioned in the path of one of the said cam projections, whereby when said plates are alternately positioned to strike said cam projections said cam projections alternately move said shifting member transversely to its three different positions to alternately engage said engagement means with said abutments and alternately and independently drive each said driven member and to disengage each said driven member when said drive member is rotated.

3. In a self-energizing clutch, a rotatable driving member, a pair of driven members concentrically positioned with the axis of said driving member, a shifting member slidably secured to said driving member and adapted to alternately engage said driven members when shifted to two positions, control means positioned parallel and adjacent to said shifting member, said control means including a pair of spaced resiliently mounted striker plates for alternately shifting said shifting means to its two positions to alternately engage said driven means when said driving member is rotated.

4. In a self-energizing clutch, a rotatable driving member, a pair of driven members concentrically positioned with the axis of said driving member, a shifting member slidably secured to said driving member and adapted to alternately engage said driven members when shifted to opposite transverse positions with respect to the axis of said driving member and to disengage both said driven members when shifted to its central position, and detent means operatively related to both driving member and said shifting member for retaining said shifting member in its three positions when shifted.

LLOYD J. ANDRES.

REFERENCES CITED

The following references are of record in the file of this patent:

UNITED STATES PATENTS

| Number | Name | Date |
|---|---|---|
| 82,703 | Gates | Oct. 6, 1868 |
| 1,126,924 | Valoppi | Feb. 2, 1915 |
| 2,210,668 | Hopkins | Aug. 6, 1940 |